(12) United States Patent
Gao et al.

(10) Patent No.: US 10,005,002 B2
(45) Date of Patent: Jun. 26, 2018

(54) DIVIDED-WALL COLUMN

(71) Applicants: CHINA PETROLEUM & CHEMICAL CORPORATION, Beijing (CN); Fushun Research Institute of Petroleum and Petrochemicals, SINOPEC CORP., Fushun, Liaoning (CN)

(72) Inventors: Jingshan Gao, Liaoning (CN); Xiuna Yang, Liaoning (CN); Dechen Bo, Liaoning (CN); Shengzhong Zhang, Liaoning (CN); Changjian Liao, Liaoning (CN)

(73) Assignees: CHINA PETROLEUM & CHEMICAL CORPORATION, Beijing (CN); FUSHUN RESEARCH INSTITUTE OF PETROLEUM AND PETROCHEMICALS, SINOPEC CORP., Fushun, Liaoning (CN)

( * ) Notice: Subject to any disclaimer, the term of this patent is extended or adjusted under 35 U.S.C. 154(b) by 192 days.

(21) Appl. No.: 15/031,377

(22) PCT Filed: Oct. 21, 2014

(86) PCT No.: PCT/CN2014/089039
§ 371 (c)(1),
(2) Date: Apr. 22, 2016

(87) PCT Pub. No.: WO2015/058671
PCT Pub. Date: Apr. 30, 2015

(65) Prior Publication Data
US 2016/0263492 A1   Sep. 15, 2016

(30) Foreign Application Priority Data

Oct. 23, 2013 (CN) .......................... 2013 1 0499259

(51) Int. Cl.
*B01D 3/14* (2006.01)
*B01D 3/00* (2006.01)

(52) U.S. Cl.
CPC ............. *B01D 3/141* (2013.01); *B01D 3/008* (2013.01)

(58) Field of Classification Search
CPC .............................. B01D 3/008; B01D 3/141
See application file for complete search history.

(56) References Cited

U.S. PATENT DOCUMENTS 3,048,957 A * 8/1962 Middleton ............... B01D 3/18
  261/114.1
3,332,469 A * 7/1967 Rosenblad ............... B01D 1/22
  159/13.3

(Continued)

FOREIGN PATENT DOCUMENTS

CN   102872609 A * 1/2013 ............... B01D 3/14

OTHER PUBLICATIONS

CN102872609A ENG (Translation of Gao) (Year: 2013).*
CN102872609A_ENG (Espacenet English translation of Gao) (Year: 2013).*

*Primary Examiner* — Renee E Robinson
*Assistant Examiner* — Gabriel E Gitman
(74) *Attorney, Agent, or Firm* — Novick, Kim & Lee, PLLC; Allen Xue

(57) ABSTRACT

A dividing wall column (10), comprising: a partition plate (11) arranged along an axial direction of the dividing wall column (10); a first shaft (22) arranged along a radial direction of the dividing wall column (10), and a first splitter plate (23) with an end connected to the first shaft (22), which are both placed beneath the partition plate (11), wherein the first splitter plate (23) is configured to be pivotable around the first shaft (22), so as to control distribution of a stream from below the first splitter plate (23) into spaces formed at (Continued)

two sides of the partition plate (11); and a second shaft (13) arranged along the radial direction of the dividing wall column (10), and a second splitter plate (20) with an end connected to the second shaft (13), which are both placed above the partition plate (11), wherein the second splitter plate (20) is configured to be pivotable around the second shaft (13), so as to control the stream from above the second liquid splitter plate (20) into the spaces formed at two sides of the partition plate (11).

17 Claims, 5 Drawing Sheets

(56) References Cited

U.S. PATENT DOCUMENTS

| | | | | |
|---|---|---|---|---|
| 4,476,852 | A * | 10/1984 | Lee | F23L 11/00 |
| | | | | 110/203 |
| 5,897,748 | A * | 4/1999 | Kaibel | B01D 3/008 |
| | | | | 196/111 |
| 6,551,465 | B1 * | 4/2003 | Van Zile | B01D 3/14 |
| | | | | 159/44 |
| 6,558,515 | B1 * | 5/2003 | Steacy | B01D 3/141 |
| | | | | 196/111 |
| 2011/0183600 | A1 * | 7/2011 | Chua | F24F 7/06 |
| | | | | 454/358 |

* cited by examiner

DIVIDED-WALL COLUMN

FIELD OF THE INVENTION

The present disclosure relates to the field of chemical apparatus, and in particular, to a new dividing wall column.

BACKGROUND OF THE INVENTION

Distillation technology, the most widely used unit operation in the chemical field, although has considerable advantages, meanwhile demands relatively high energy consumption and investments. The energy consumption of distillation accounts for more than a half the total energy consumption of a chemical process or the like. Thermally coupled distillation, a complex distillation approach proposed in the 1940s and 1950s, can reduce irreversible effective energy consumption in a procedure, and thereby reduce energy consumption of the procedure. As has been proved both in theory and practice, a thermally distillation column enables about 30% of decrease in average energy consumption as compared with a conventional distillation solution. Thermally coupled distillation typically refers to full thermocouple distillation. In connection with distillation comprising separation of a three-constituent mixture or separation of a mixture to obtain three products, a thermally coupled distillation column can be a Petlyuk distillation column or a vertical partition plate distillation column. Although the two are thermodynamically equivalent, investments on devices can be further cut down when the vertical partition plate distillation column is used. Nevertheless, the partition plate distillation column, with a pre-separation column and a main column integrated into one column shell, is regarded as one special case of Petlyuk column by some people. In the vertical partition plate distillation column, a vertical partition plate is arranged in the distillation column to divide the distillation column substantially into four parts, including an overhead section, a bottom section, and a feed section and an intermediate side-draw product section separated by the partition plate. Compared with a conventional two-regular-column sequence flow, the vertical partition plate distillation column can save 30-60% of energy consumption and about 30% of investments in devices, with increased operating capacity. Although a dividing wall column has prominent advantages as mentioned above, it took rather a long time for the concept of dividing wall column, which was first proposed in the 1930s, to be industrially used. This is mainly because wide use of the dividing wall column is blocked by lack of reliable design procedures and feasible operation and control solutions.

U.S. Pat. No. 4,230,533 uses liquid reflux powered by difference in liquid levels, which are regulated by means of a flow meter, wherein distribution of a vapor moving upwardly from the bottom of the column is regulated through by-pass conduit means, and vapor distribution is irrelevant with distribution of liquid reflux. U.S. Pat. No. 5,755,933 discloses a dividing wall column which has a partition plate extending to a top or bottom of the column, and respective condensers or reboilers are used for reflux. U.S. Pat. No. 7,267,746 discloses a control method of a dividing wall column, comprising feeding streams of different constituents from different portions of the column, so as to form liquid reflux control and regulate flow of the streams entering the column, with an overhead temperature as a regulation index. The above technologies have a common defect, i.e., inability of independent control of overhead liquid reflux and a rising vapor from the bottom of the column.

SUMMARY OF THE INVENTION

The present disclosure aims to remove the defect of inability of independent control of an overhead liquid reflux and a rising vapor from a bottom of a column, during the separation of multiple components in an existing dividing wall column, and to provide a new dividing wall column.

The present disclosure relates to a dividing wall column, comprising:

a partition plate arranged along an axial direction of the dividing wall column; and a first shaft arranged along a radial direction of the dividing wall column, and a first splitter plate with an end connected to the first shaft, which are both placed beneath the partition plate, wherein the first splitter plate is configured to be pivotable around the first shaft, so as to control distribution of a stream from below the first splitter plate into spaces formed at two sides of the partition plate.

In one preferred embodiment of the present disclosure, the first shaft is configured to be able to drive the first splitter plate to rotate.

In one preferred embodiment of the present disclosure, the first splitter plate is configured to be able to rotate between a first position, at which the first splitter plate can prevent the stream from below the first splitter plate from entering the space formed at one side of the partition plate, and a second position, at which the first splitter plate can stop the stream from below the first splitter plate from entering the space formed at the other side of the partition plate. Specifically, the first splitter plate has a rotation angle in the range from 90° to −90°, preferably 80° to −80°, with respect to an axis of the dividing wall column.

In one preferred embodiment of the present disclosure, the partition plate and the first shaft are located in a same axial plane of the dividing wall column, i.e., a plane where a central axis of the dividing wall column is located.

In one preferred embodiment of the present disclosure, the dividing wall column has a round cross section, and the first splitter plate is in shape of a circular segment. Specifically, a straight edge of the first splitter plate is in parallel with the partition plate, and the straight edge has a length equaling an inner diameter of a column. A vertical distance from a vertex of an arcuate edge of the first splitter plate to a center of the straight edge of the first splitter plate is in the range from ⅛ D to ½ D, preferably ⅓ D to ½ D, wherein D refers to the inner diameter of the column.

In one preferred embodiment of the present disclosure, the spaces formed at two sides of the partition plate have equal cross-sectional areas; the circular segment of the first splitter plate has a chord as long as an inner diameter of the dividing wall column; and a vertical distance from a top of the circular segment of the first splitter plate to the chord of the circular segment of the first splitter plate is shorter than a distance from a center of the dividing wall column to an inner wall of the dividing wall column.

In one preferred embodiment of the present disclosure, the first splitter plate is connected to the first shaft, which can rotate and thereby drive the first splitter plate to rotate; the first shaft and the partition plate are connected to each other by means of a baffle, the first shaft, the baffle, and the partition plate being located in a same plane; and the first shaft has one end supported on an inner wall of a column, and another end connected to a rotation controller after passing through a column shell.

In one preferred embodiment of the present disclosure, the first splitter plate is connected to the first shaft, which can rotate and thereby drive the first splitter plate to rotate; the first shaft is placed beneath the partition plate, to achieve seamless rolling contact with the partition plate; and the first shaft has one end supported on an inner wall of a column, and another end connected to a rotation controller through a column shell.

In one specific embodiment of the present disclosure, the dividing wall column comprises the column and the partition plate, wherein the partition plate divides the column into four parts including an overhead section, a bottom section, a feed section, and an intermediate side-draw product section. The dividing wall column further comprises the first splitter plate and a rotation shaft that are used for vapor distribution, wherein the first splitter plate is in shape of a circular segment, and the straight edge of the first splitter plate is connected to the rotation shaft, and can rotate in the bottom section driven by the rotation shaft. The rotation shaft is placed in the bottom portion of the partition plate, to achieve seamless rolling contact with the bottom portion of the partition plate. The rotation shaft has one end supported on the inner wall of the column, and another end connected to the rotation controller after passing through the column shell. The partition plate is vertically placed along a central line of the column, and the center of the partition plate is in coincidence with the center of the column. The partition plate has a length in the range from 0.3 H-0.9 H, preferably 0.4 H-0.8 H, wherein H refers to height of the column. The rotation controller can use either electric or pneumatic control to achieve continuous rotation regulation at an accuracy in the range from 0.3° to 0.5°.

In one preferred embodiment of the present disclosure, the dividing wall column further comprises one or a plurality of baffle plates arranged on the inner wall of the dividing wall column in a space formed below the partition plate and above the first shaft.

In one preferred embodiment of the present disclosure, the dividing wall column further comprises one or a plurality of baffle plates arranged on the inner wall of the dividing wall column in the spaces formed at two sides of the partition plate adjacent to a bottom of the partition plate.

In one preferred embodiment of the present disclosure, the baffle plate is in shape of a circular segment, and has a tilt angle in the range from 5° to 20° with respect to a circumferential plane of the dividing wall column.

In one preferred embodiment of the present disclosure, the baffle plates are symmetrically arranged with respect to a plane in which the partition plate is located.

In one preferred embodiment of the present disclosure, a vertical distance from a vertex of an arcuate edge of the baffle plate to the bottom of the partition plate is in the range from 50 mm to 400 mm.

In one preferred embodiment of the present disclosure, the dividing wall column further comprises velocity probes, respectively arranged on inner walls of the dividing wall column at two sides of a vapor splitter plate in spaces formed below the baffle plates and above the first shaft.

In the new dividing wall column of the present disclosure, the rotation controller can use either electronic or pneumatic control to achieve continuous rotation at an accuracy in the range from 0.3°-0.5°.

In one specific embodiment of the present disclosure, the baffle plates, in shape of circular segments, are symmetrically placed, with respect to a plane in which the partition plate is located, at two sides of a bottom of the column, at a tilt angle in the range from 5° to 20°, preferably 5° to 15° with respect to a horizontal plane. The arcuate edges of the baffles plates are seamlessly welded into one piece with the inner wall of the column. The vertical distance from the vertex of the arcuate edge of the baffle plate to the bottom of the partition plate is in the range from 50 mm to 400 mm, preferably 80 mm to 300 mm. A straight edge of the baffle plate is in parallel with a bottom edge of the partition plate, and the vertical distance from the vertex of the arcuate edge of the baffle plate to a midpoint of a straight edge of the baffle plate is in the range from ⅛ D to ½ D, preferably ¼ D to ⅜ D, wherein D refers to the inner diameter of the column. In a region below the baffle plate, two vapor phase spaces are formed at two sides of the vapor splitter plate. The velocity probes are respectively placed in the two pure vapor phase spaces formed at the two sides of the vapor splitter plate, and horizontally inserted into the dividing wall column, wherein the probes each have a length in the column in the range from 50 mm to 300 mm, preferably 80 mm to 200 mm. The vertical distance from the velocity probe to the baffle plate is in the range from 100 mm to 600 mm, preferably 150 mm to 500 mm.

In one preferred embodiment of the present disclosure, a second shaft arranged along the radial direction of the dividing wall column, and a second splitter plate with an end connected to the second shaft are placed above the partition plate, wherein the second splitter plate is configured to be pivotable around the second shaft, so as to control distribution of the stream from above the second splitter plate into the spaces formed at two sides of the partition plate.

In one preferred embodiment of the present disclosure, the second shaft is configured to be able to drive the second splitter plate to rotate.

In one preferred embodiment of the present disclosure, the second splitter plate is configured to be able to rotate between a third position, in which the second splitter plate can prevent a stream from above the second splitter plate from entering the space formed at one side of the partition plate, and a fourth position, in which the second splitter plate can prevent a stream from above the second splitter plate from entering the space formed at the other side of the partition plate. Specifically, the second splitter plate has a rotation angle in the range from 90° to −90°, preferably 80° to −80°, with respect to the axis of the partitioned column.

In one preferred embodiment of the present disclosure, the partition plate and the second shaft are located in a same axial plane of the partitioned column, i.e., a plane where the central axis of the partitioned column is located.

In one preferred embodiment of the present disclosure, the partitioned column has a round cross section, and the second splitter plate is in shape of a circular segment. Specifically, a straight edge of the second splitter plate is in parallel with the partition plate, and the straight edge has a length equaling the inner diameter of the column. A vertical distance from a vertex of an arcuate edge of the second splitter plate to a center of the straight edge of the splitter plate is in the range from ⅛ D to ½ D, preferably ¼ D to ½ D, wherein D refers to the inner diameter of the column.

In one preferred embodiment of the present disclosure, the spaces formed at two sides of the partition plate have equal cross-sectional areas; the circular segment of the second splitter plate has a chord as long as the inner diameter of the dividing wall column; and a vertical distance from a top of the circular segment of the second splitter plate to a chord of the circular segment of the second splitter plate is shorter than the distance from the center of the dividing wall column to the inner wall of the dividing wall column.

In one preferred embodiment of the present disclosure, the second splitter plate is connected to the second shaft, which can rotate and thereby drive the second splitter plate to rotate; the second shaft is placed on the top of the partition plate, to achieve seamless rolling contact with the top of the partition plate; and the second shaft has one end supported on an inner wall of the column, and another end connected to a rotation controller after passing through the column shell.

In one specific embodiment of the present disclosure, the dividing wall column comprises the column and the partition plate, wherein the partition plate divides the column into four parts including the overhead section, the bottom section, the feed section, and the intermediate side-draw product section. The dividing wall column further comprises the second splitter plate and a rotation shaft that are used for liquid distribution, wherein the second splitter plate is in shape of a circular segment, and the straight edge of the second splitter plate is connected to the rotation shaft, and can rotate in the overhead section driven by the rotation shaft. The rotation shaft is placed on the top of the partition plate, to achieve seamless rolling contact with the top of the partition plate. The rotation shaft has one end supported on the inner wall of the column, and another end connected to the rotation controller after passing through the column shell. The partition plate is vertically placed along a central line of the column, and the center of the partition plate is in coincidence with the center of the column. The partition plate has a length in the range from 0.3 H to 0.9 H, preferably 0.4 H to 0.8 H, wherein H refers to height of the column. The rotation controller can use either electric or pneumatic control to achieve continuous rotation regulation at an accuracy of 0.3° to 0.5°.

In the dividing wall column of the present disclosure, the first splitter plate used for vapor distribution operates in the following steps. The flow rate detectors first detect flow velocities of vapors at two sides of the partition plate, and transmit signals of flow velocities to the rotation controller. Afterwards, the rotation controller calculates the distribution ratio of vapors at two sides of the partition plate as per a preconfigured calculation program, compares such ratio with a predetermined distribution ratio of vapors, performs logical analysis according to a difference value therebetween, and issues a regulation instruction. The rotation controller then regulates the rotation shaft, and thereby regulates the vapor splitter plate for it to rotate to a required position.

In the dividing wall column of the present disclosure, the second splitter plate used for liquid distribution operates in the following steps. The rotation controller, in accordance with the distribution ratio of liquids at two sides of the partition plate in the dividing wall column as requested by technological operations, analyzes and calculates, via an internally defined calculation program, a rotation angle of the liquid splitter plate to be regulated in order to achieve the prescribed distribution ratio of liquids, and issues an execution instruction. The rotation controller then regulates the rotation shaft, and thereby regulates the liquid splitter plate for it to rotate to a required position.

In one specific embodiment of the present disclosure, the dividing wall column can be operated in the following steps. After a feed stream to be separated is fed into the dividing wall column, flash happens in the feed section. A resulting vapor phase rises along the column, followed by contact separation between such vapor phase and the overhead liquid reflux; while a resulting liquid phase in the feed section under the feed plate flows down the column, which precedes countercurrent contact separation between such liquid phase stream and the rising vapor from the bottom of the column. The vapors rising through two sides of the partition plate, after being mixed with each other, are led out of the column through an overhead pipeline. The vapor mixture is condensed into a liquid in the overhead condenser, and the resulting liquid is partially drawn-off as an overhead product, and partially returns into the column as the liquid reflux. The liquid reflux that returns into the column, after being distributed as per a prescribed distribution ratio of the control system by means of the second splitter plate located above the partition plate, flows into two sides at the top portion of the partition plate, and homogeneously distributed through the liquid distributor, followed by contact separation between the homogeneously distributed liquid reflux and the rising vapor phase stream. A side-draw outlet is provided at a proper position of the side-draw side of the dividing wall column to draw off a side-draw product.

In addition, the liquid reflux from two sides of the partition plate are collected at the center of the column after passing by the baffle plates arranged at two sides in the bottom of the partition plate. Below the baffle plates, two vapor phase spaces are formed at two sides of the splitter plate. Two vapor flow rate detectors are arranged in the vapor phase spaces, for measuring velocities of vapors rising from the bottom of the column. Signals detected by the vapor flow rate detectors are transmitted to the vapor distribution control system, e.g., the first splitter plate of the present disclosure, which issues and executes a control instruction upon logical analysis. The vapor rising from the bottom of the column, after being distributed by the vapor distribution control system as per a prescribed distribution ratio, enters two sides of the partition plate, which precedes contact separation between such rising vapor and the liquid reflux from two sides of the partition plate in the top portion of the column. A stream in the bottom is drawn out as a bottoms product.

In a dividing wall column comprising both of the above first splitter plate and second splitter plate, the above first splitter plate and second splitter plate can operate simultaneously to perform distribution of both the stream from below the partition plate and that from above the partition plate.

Specifically, the new dividing wall column of the present disclosure has the following advantages.

(1) According to the method provided in the present disclosure, vapor distribution and detection are both accomplished within the dividing wall column, thereby eliminating external accessory structures of the column, simplifying design of the column, and cutting down investments in devices.

(2) According to the method provided in the present disclosure, the problem of inability of independent detection of vapor flow rates can be solved in the vapor-liquid two phase environment within the column, thereby achieving detection of vapor flow rates in coexistence of vapor-liquid two phases.

(3) In the dividing wall column provided by the present disclosure, independent and accurate regulation and control of vapor distribution and liquid distribution at two sides of the partition plate can be achieved.

(4) The control method provided in the present disclosure is easy to operate and convenient to regulate.

DETAILED DESCRIPTION OF THE EMBODIMENTS

The present disclosure will be explained in detail with reference to the examples, whereby it can be fully understood how to solve the technical problem by the technical means according to the present disclosure and achieve the technical effects thereof, and thus the technical solution according to the present disclosure can be implemented. It is important to note that as long as there is no structural conflict, all the technical features mentioned in all the examples could be combined together in any manner, and the technical solutions obtained in this manner all fall within the scope of the present disclosure.

Figure 1:
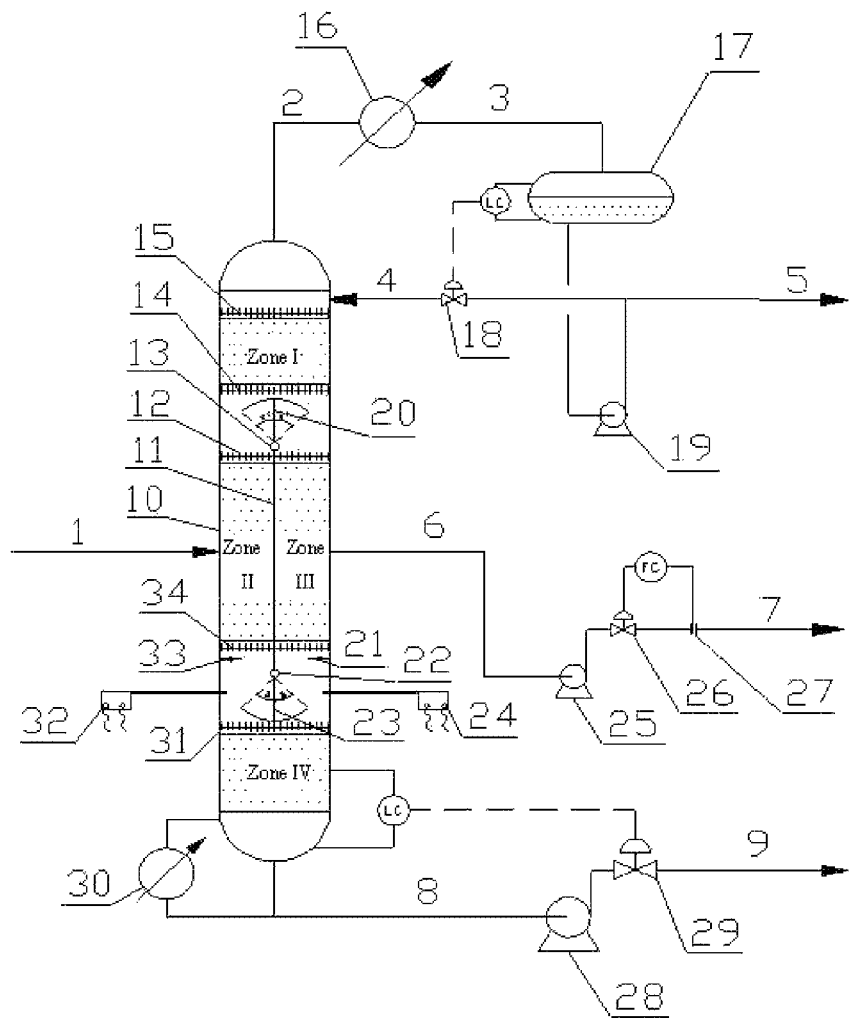
FIG. 1 is a specific structural diagram of a new dividing wall column according to the present disclosure.
Figure 2:
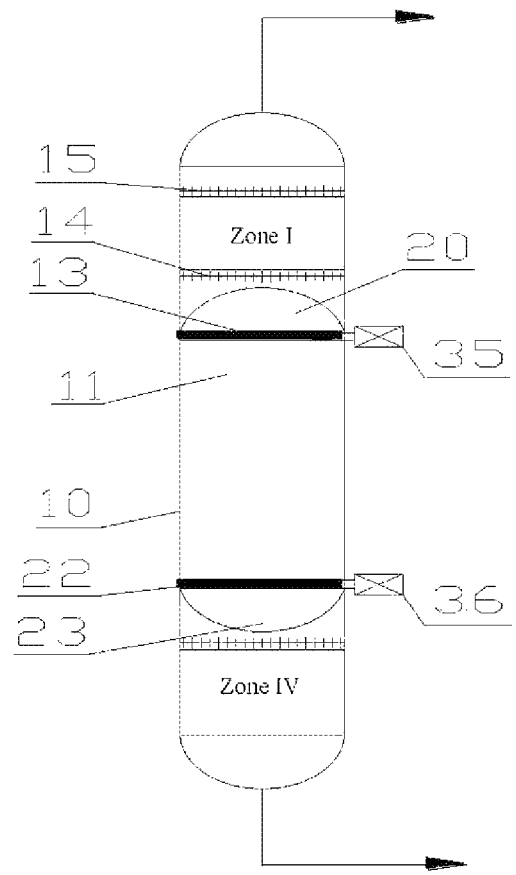
FIG. 2 shows a side view of the dividing wall column.
Figure 3:
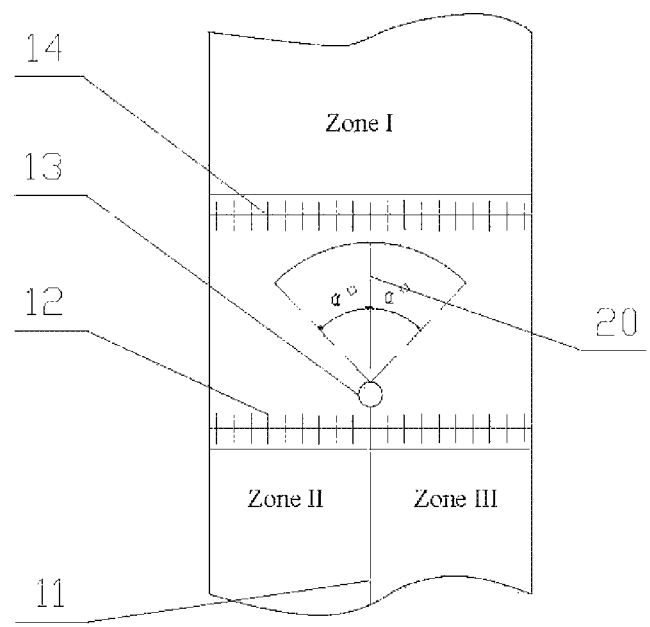
FIG. 3 shows a liquid distribution control system.
Figure 4:
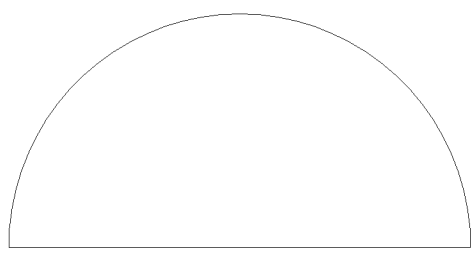
FIG. 4 shows a liquid splitter plate.
Figure 5:
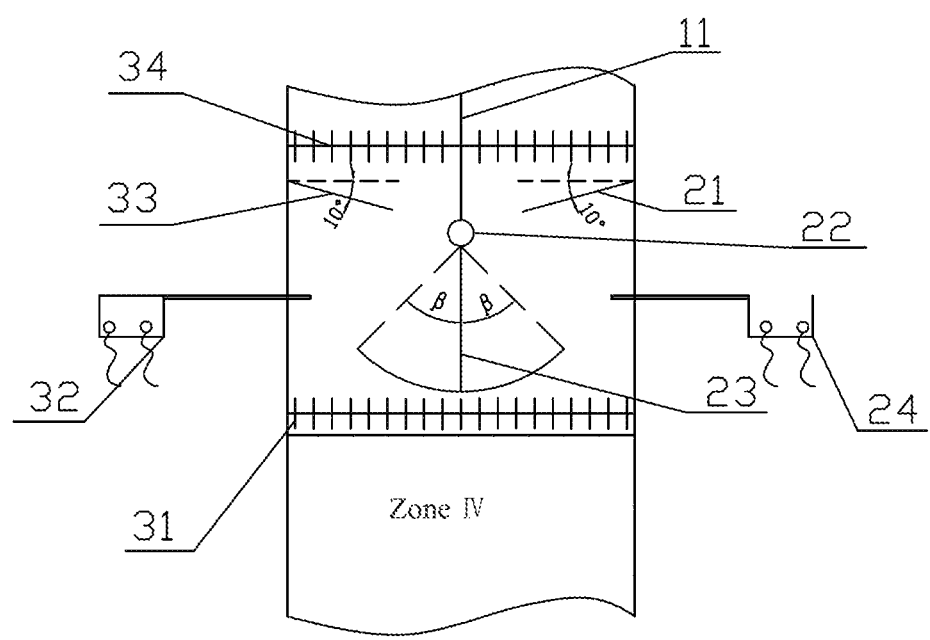
FIG. 5 shows a vapor distribution control system.
Figure 6:
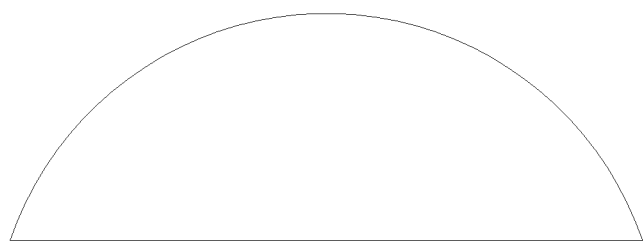
FIG. 6 shows a vapor splitter plate.
Figure 7:
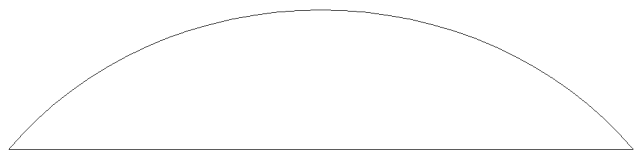
FIG. 7 shows a baffle plate.

As shown in FIGS. 1-7, a dividing wall column comprises a partition plate 11, a liquid distributor 12, a liquid distributor 15, a vapor distributor 14, a liquid distributor 31, a vapor distributor 34, a liquid splitter plate (second splitter plate) 20, a vapor splitter plate (first splitter plate) 23, etc. The above components divide the dividing wall column into zone I, zone II, zone III, and zone IV. The space formed between the vapor distributor 14 and the liquid distributor 15 is zone I; the spaces formed at two sides of the partition plate 11, zone II (a feed section) and zone III (side-draw section) are separated from each other by the partition plate 11; and placed beneath the liquid distributor 31 is zone IV.

The partition plate 11, vertically placed along a central line of a column, has a center in coincidence with the center of the column, and a length in the range from 0.3 H-0.9 H, preferably 0.4 H-0.8 H, wherein H refers to height of the column. The liquid splitter plate 20 has a rotation angle in the range from 90° to −90°, preferably 80° to −80°, with respect to an axis of the dividing wall column. The vapor splitter plate 23 has a rotation angle in the range from 90° to −90°, preferably 80° to −80°, with respect to the axis of the dividing wall column.

A straight edge of the liquid splitter plate 20 is connected to a second shaft 13, and can rotate in an overhead section driven by a rotation shaft. The rotation shaft, which is placed on a top of the partition plate 11, to achieve seamless rolling contact with the top of the partition plate 11, has an end supported on an inner wall of the column, and another end connected to a rotation controller 35 after passing through a column shell. The partition plate 11, vertically placed along a central line of the column, has a center in coincidence with the center of the column, and a length in the range from 0.3 H-0.9 H, preferably 0.4 H-0.8 H, wherein H refers to height of the column. The rotation controller 35 can use either electric or pneumatic control, to achieve continuous rotation regulation at an accuracy in the range from 0.3° to 0.5°.

A straight edge of the vapor splitter plate 23 is connected to a first shaft 22, and can rotate in a bottom section driven by a rotation shaft. The rotation shaft, which is placed beneath of the partition plate 11, to achieve seamless rolling contact with the bottom portion of the partition plate 11, has an end supported on an inner wall of the column, and another end connected to a rotation controller 36 after passing through the column shell. The partition plate 11, vertically placed along the central line of the column, has a center in coincidence with the center of the column, and a length in the range from 0.3 H-0.9 H, preferably 0.4 H-0.8 H, wherein H refers to height of the column. The rotation controller 36 can use either electric or pneumatic control, to achieve continuous rotation regulation at an accuracy in the range from 0.3° to 0.5°.

In the present disclosure, a feed stream 1 to be separated, which comprises three or more components, enters the dividing wall column 10 under certain conditions. The feed stream first flashes in zone II, after which, a separated vapor phase rises in zone II and mixes, at an upper portion of the liquid splitter plate 20, with a vapor rising in zone III. The resulting vapor mixture, after being distributed through the vapor distributor 14, rises and enters zone I. After countercurrent contact separation between the vapor mixture rising in zone I and an overhead liquid reflux, a resulting vapor phase is drawn out through an overhead pipeline 2 and condensed into a liquid through an overhead condenser 16. The liquid enters an overhead buffer tank 17 through a pipeline 3, and is pumped by an overhead reflux pump 19. The pumped liquid is then partially drawn off through a pipeline 5 as an overhead product, and partially returns, as the overhead liquid reflux, into the column through a pipeline 4 under regulation of a reflux control valve 18. After being distributed by means of the liquid distributor 15, the overhead liquid reflux becomes a liquid reflux in zone I. The liquid reflux in zone I, after being distributed through a liquid distribution control system, enters, in accordance with a distribution ratio prescribed by the control system, two sides in the top portion of the partition plate 11, and is distributed through the liquid distributor 12, followed by contact separation between the distributed liquid reflux and a rising vapor phase stream. In a side-draw side of the dividing wall column, a side-draw product is pumped by a side-draw pump 25 through a pipeline 6, and after being measured by a flowmeter 27 under regulation of a flow control valve 26, is drawn out of the column through a pipeline 7 at a prescribed flow rate. The liquid reflux from two sides of the partition plate 11 are collected at the center of the column after passing by baffle plates 21 and 33 symmetrically arranged with each other at two sides in the bottom portion of the partition plate 11. The resulting liquid collection, after being distributed in the liquid distributor 31, enters zone IV. In a region below the baffle plates, two pure vapor phase spaces are formed at two sides of the splitter plate. Two vapor flow rate detectors 24 and 32 are respectively arranged in the vapor phase spaces, for measuring velocity of a vapor rising from the bottom of the column. Signals detected by the vapor flow rate detectors are transmitted to the rotation controller 36, which issues and executes control instructions upon logical analysis. The vapor rising from the bottom of the column, after being distributed by a vapor distribution control system as per a prescribed distribution ratio, enters two sides of the partition plate 11, and distributed in the vapor distributor 34, followed by contact separation between such distributed vapor and the liquid reflux from two sides of the partition plate of the column. A bottoms stream partially returns into the column after being heated by a reboiler 30, and the remaining par is pumped by a bottom pump 28 through a pipeline 8, and drawn out as a bottoms product through a pipeline 9 while being regulated by a liquid level control valve 29.

In the present disclosure, the distribution ratio of liquids at two sides of the top portion of the partition plate 11 is regulated by the liquid distribution control system provided in the top portion of the partition plate. First, the rotation controller 35, in accordance with the distribution ratio of liquids at two sides of the partition plate in the dividing wall column as requested by technological operations, analyzes and calculates, via an internally defined calculation program, a rotation angle of the liquid splitter plate 20 to be regulated in order to achieve the prescribed distribution ratio of liquids, and issues an execution instruction. The rotation controller then regulates the second shaft 13, and thereby regulates the liquid splitter plate for it to rotate to a required position.

In the present disclosure, the distribution of vapors at two sides of the bottom portion of the partition plate is regulated by the vapor distribution control system provided in the bottom of the partition plate. The flow rate detectors 24 and 32 first respectively detect flow velocities of vapors at two sides of the partition plate, and transmit detected signals of flow velocities to the rotation controller 36. Afterwards, the rotation controller calculates the distribution ratio of vapors at two sides of the partition plate as per a preconfigured calculation program, compares such ratio with a predetermined distribution ratio of vapors, performs logical analysis according to a difference value therebetween, and issues a regulation instruction. The rotation controller then regulates the first shaft 22, and thereby regulates the vapor splitter plate 23 for it to rotate to a required position.

The solutions and effects of the present disclosure will be further explained with examples. In the examples as shown in FIGS. 1-7, the dividing wall column has a diameter of 0.4 m. The liquid splitter plate, in shape of a semicircle, has a radius of 0.2 m and an area of 0.063 m². The distance from a vertex of an arcuate edge of the vapor splitter plate to a midpoint of the straight edge of the vapor splitter plate is 0.14 m, and the area of the vapor splitter plate is 0.04 m². The baffle plate has a tilt angle of 10°. The vertical distance from an arcuate edge of the baffle plate to a bottom of the partition plate is 0.1 m, and the distance from a vertex of an arcuate edge of the baffle plate to a midpoint of the straight edge of the baffle plate is 0.1 m. The velocity probes of the flow rate detectors are respectively arranged in the two pure vapor phase spaces formed at two sides of the vapor distribution plate. When the velocity probe is horizontally inserted into the dividing wall column, it will have a length of 0.05 m in the column, and a vertical distance of 0.2 m to the baffle plate.

Example 1

A mixture of n-pentane (A), n-hexane (B), and n-heptane (C) was used as a separation system. Basic operating parameters were shown in Table 1.

TABLE 1

| Basic operating parameters | |
|---|---|
| Feed rate | 1000 kg/h |
| Components of feed material [$C_A$, $C_B$, $C_C$] | [0.3, 0.3, 0.4] |
| Overall reflux ratio | 3 |
| Overhead temperature, ° C. | 51 |
| Bottoms temperature, ° C. | 101 |

TABLE 1-continued

| Basic operating parameters | |
|---|---|
| Distribution ratio of liquids (zone II/zone IV) | 0.4:0.6 |
| Distribution ratio of vapors (zone II/zone IV) | 0.5:0.5 |

The parameters of a stream distribution control system were indicated in Table 2.

TABLE 2

| parameters of stream distribution control system | |
|---|---|
| Rotation angle of liquid splitter plate 20 (towards zone II) | 11.5° |
| Rotation angle of vapor splitter plate 23 (towards zone IV) | 8.5° |
| Flow rate of vapor (zone II) | 0.75 m/s |
| Flow rate of vapor (zone IV) | 0.75 m/s |

The separation effects were shown in Table 3.

TABLE 3

| Separation effects | | | | |
|---|---|---|---|---|
| Name of stream | | Overhead product | Side-draw product | Bottoms product |
| Purity of constituent | A | 99.9% | 70 ppm | 40 ppm |
| | B | 100 ppm | 99.9% | 75 ppm |
| | C | 80 ppm | 50 ppm | 99.9% |

Example 2

Straight-run gasoline was used as the separation system. The properties of the gasoline were shown in Table 4.

TABLE 4

| Properties of straight-run gasoline | |
|---|---|
| Component | Distillation range (D86)/% |
| IBP | 67.1 |
| 10% | 71.6 |
| 30% | 78.5 |
| 50% | 89.9 |
| 70% | 122.7 |
| 90% | 165.6 |
| FBP | 193.0 |

The basic operating parameters were shown in Table 5.

TABLE 5

| Basic operating parameters | |
|---|---|
| Feed rate | 1000 kg/h |
| Overall reflux ratio | 2 |
| Overhead temperature, ° C. | 74 |
| Bottoms temperature, ° C. | 161 |
| Distribution ratio of liquids (zone II/zone IV) | 0.4:0.6 |
| Distribution ratio of vapors (zone II/zone IV) | 0.45:0.55 |

The parameters of the stream distribution control system were indicated in Table 6.

TABLE 6

Parameters of stream distribution control system

| | |
|---|---|
| Rotation angle of liquid splitter plate 20 (towards zone II) | 11.5° |
| Rotation angle of vapor splitter plate 23 (towards zone II) | 7° |
| Flow rate of vapor (zone II) | 0.63 m/s |
| Flow rate of vapor (zone IV) | 0.77 m/s |

The separation effects were shown in Table 7.

TABLE 7

Separation effects

| Component (D86) | Overhead product/° C. | Side-draw product/° C. | Bottoms product/° C. |
|---|---|---|---|
| IBP | 56.8 | 85.2 | 144.7 |
| 10% | 60.5 | 94.3 | 149.1 |
| 30% | 62.8 | 107.1 | 157.0 |
| 50% | 69.1 | 114.1 | 163.7 |
| 70% | 73.6 | 121.3 | 171.9 |
| 90% | 86.8 | 131.5 | 186.8 |
| FBP | 98.9 | 149.6 | 194.5 |

In the table, IBP and FBP respectively indicated that the components (D86) were 0% and 100% (the same shall apply hereinafter).

Example 3

Straight-run gasoline was used as the separation system. The properties of the gasoline were shown in Table 4.
The basic operating parameters were shown in Table 8.

TABLE 8

Basic operating parameters

| | |
|---|---|
| Feed rate | 1000 kg/h |
| Overall reflux ratio | 2.5 |
| Overhead temperature, ° C. | 73.1 |
| Bottoms temperature, ° C. | 162 |
| Distribution ratio of liquids (zone II/zone IV) | 0.5:0.5 |
| Distribution ratio of vapors (zone II/zone IV) | 0.48:0.52 |

The parameters of the stream distribution control system were indicated in Table 9.

TABLE 9

The parameters of stream distribution control system

| | |
|---|---|
| No liquid splitter plate was arranged. | |
| Rotation angle of vapor splitter plate 23 (towards zone II) | 4.5° |
| Flow rate of vapor (zone II) | 0.72 m/s |
| Flow rate of vapor (zone IV) | 0.78 m/s |

The separation effects were shown in Table 10.

TABLE 10

Separation effects

| Component (D86) | Overhead product/° C. | Side-draw product/° C. | Bottoms product/° C. |
|---|---|---|---|
| IBP | 56.8 | 83.1 | 141.1 |
| 10% | 61.2 | 91.2 | 144.4 |
| 30% | 63.5 | 105.3 | 155.3 |
| 50% | 69.8 | 111.4 | 160.1 |
| 70% | 75.2 | 118.5 | 169.9 |
| 90% | 89.1 | 129.5 | 181.8 |
| FBP | 103.4 | 148.4 | 193.8 |

Example 4

Naphtha was used as the separation system, the properties of which were shown in Table 11.

TABLE 11

Properties of naphtha

| Component | Distillation range (D86)/% |
|---|---|
| IBP | 55.3 |
| 10% | 85.3 |
| 30% | 101.0 |
| 50% | 117.1 |
| 70% | 132.9 |
| 90% | 153.7 |
| FBP | 171.5 |

The basic operating parameters were shown in Table 12.

TABLE 12

Basic operating parameters

| | |
|---|---|
| Overall reflux ratio | 15 |
| Overhead temperature, ° C. | 68.5 |
| Bottoms temperature, ° C. | 208.4 |
| Distribution ratio of liquids (zone II/zone IV) | 0.83:0.17 |
| Distribution ratio of vapors (zone II/zone IV) | 0.4:0.6 |

The parameters of the stream distribution control system were indicated in Table 13.

TABLE 13

The parameters of stream distribution control system

| | |
|---|---|
| Rotation angle of liquid splitter plate 20 (towards zone II) | 55° |
| Rotation angle of vapor splitter plate 23 (towards zone II) | 11° |
| Flow rate of vapor (zone II) | 0.44 m/s |
| Flow rate of vapor (zone IV) | 0.67 m/s |

The separation effects were shown in Table 14.

TABLE 14

Separation effects

| Component (D86) | Overhead product/° C. | Side-draw product/° C. | Bottoms product/° C. |
|---|---|---|---|
| IBP | 35.4 | 77.4 | 151.2 |
| 10% | 37.5 | 86.7 | 156.5 |
| 30% | 42.2 | 98.0 | 159.8 |
| 50% | 48.3 | 108.6 | 163.9 |
| 70% | 52.1 | 119.5 | 169.3 |
| 90% | 55.6 | 130.7 | 171.4 |
| FBP | 60.3 | 141.5 | 174.5 |

Comparative Example 1

The stream of Example 4 above was separated with the method disclosed in U.S. Pat. No. 4,230,533. The operating parameters and separation effects were respectively shown in Tables 15 and 16 below.

TABLE 15

| Basic operating parameters | |
| --- | --- |
| Overall reflux ratio | 16 |
| Overhead temperature, ° C. | 69.0 |
| Bottoms temperature, ° C. | 212.3 |
| Distribution ratio of liquids (zone II/zone IV) | 0.85:0.15 |
| Distribution ratio of vapors (zone II/zone IV) | 0.4:0.6 |

TABLE 16

| | Separation effects | | |
| --- | --- | --- | --- |
| Component (D86) | Overhead product/° C. | Side-draw product/° C. | Bottoms product/° C. |
| IBP | 35.2 | 76.8 | 149.1 |
| 10% | 36.9 | 85.9 | 155.5 |
| 30% | 41.5 | 98.1 | 159.1 |
| 50% | 47.7 | 108.2 | 164.3 |
| 70% | 51.1 | 118.2 | 169.9 |
| 90% | 55.9 | 132.1 | 170.4 |
| FBP | 61.3 | 143.1 | 174.9 |

LIST OF REFERENCE NUMBERS

- 10: dividing wall column;
- 11: partition plate;
- 12: liquid distributor;
- 13: second shaft;
- 14: vapor distributor;
- 15: liquid distributor;
- 16: overhead condenser;
- 17: overhead buffer tank;
- 18: reflux control valve;
- 19: overhead reflux pump;
- 20: liquid splitter plate (second splitter plate);
- 21: baffle plate;
- 22: first shaft;
- 23: vapor splitter plate (first splitter plate);
- 24: flow rate detector;
- 25: side-draw pump;
- 26: flow control valve;
- 27: flowmeter;
- 28: bottom pump;
- 29: liquid level control valve;
- 30: bottom reboiler;
- 31: liquid distributor;
- 32: flow rate detector;
- 33: baffle plate;
- 34: vapor distributor; and
- 35, 36: rotation controller.

The invention claimed is:

1. A dividing wall-column, comprising:
a partition plate arranged along an axial direction of the dividing wall column; and
a first shaft arranged along a radial direction of the dividing wall column, and a first splitter plate having an end connected to the first shaft, wherein the first shaft and the first splitter are disposed in a same axial plane in the dividing wall column, and the first shaft and the first splitter are disposed beneath the partition plate, wherein the first splitter plate is configured to be pivotable around the first shaft, so as to control distribution of a stream from below the first splitter plate into spaces formed at two sides of the partition plate,
wherein the dividing wall column has a circular cross section, and the first splitter plate is in a shape of a circular segment,
wherein a first space on a first side of the partition plate and a second space on a second side of the partition plate have a same cross-sectional area, and
wherein a length of a chord of the circular segment equals an inner diameter of the dividing wall column and a vertical distance from a top of the circular segment of the first splitter plate to the chord is shorter than a distance from a center of the dividing wall column to an inner wall of the dividing wall column.

2. The dividing wall column according to claim 1, wherein the first shaft is configured to drive the first splitter plate to rotate.

3. The dividing wall column according to claim 1, wherein the first splitter plate is configured to rotate between a first position, at which the first splitter plate impedes the stream from below the first splitter plate from entering the space formed at the first side of the partition plate, and a second position at which the first splitter plate impedes the stream from below the first splitter plate from entering the space formed at the second side of the partition plate.

4. The dividing wall column according to claim 1,
wherein the first shaft has one end supported on an inner wall of a column, and another end connected to a rotation controller disposed outside the dividing wall column.

5. The dividing wall column according to claim 4,
wherein the first shaft is placed beneath the partition plate and forms a seamless rolling contact with the partition plate.

6. The dividing wall column according to claim 5, wherein the dividing wall column further comprises one or more baffle plates arranged on the inner wall of the dividing wall column in the first space and the second space adjacent to a bottom of the partition plate.

7. The dividing wall column according to claim 6, wherein each of the one or more baffle plates is in a shape of a circular segment and has a tilt angle in the range from 5° to 20° with respect to a circumferential plane of the dividing wall column.

8. The dividing wall column according to claim 6, wherein each of the one or more baffle plates is symmetrically arranged with respect to the partition plate.

9. The dividing wall column according to claim 6, wherein a vertical distance from a vertex of an arcuate edge of each of the one or more baffle plates to the bottom of the partition plate is in the range from 50 mm to 400 mm.

10. The dividing wall column according to claim 6, wherein the dividing wall column further comprises one or more velocity probes, respectively arranged on the inner wall of the dividing wall column in the first space and the second space below the one or more baffle plates and above the first shaft.

11. The dividing wall column according to claim 1, further comprising a second shaft arranged along the radial direction of the dividing wall column, and a second splitter plate having an end connected to the second shaft, which are both placed above the partition plate, wherein the second splitter plate is configured to be pivotable around the second shaft, so as to control distribution of a stream from above the second splitter plate into the spaces formed at two sides of the partition plate.

12. The dividing wall column according to claim 11, wherein the second shaft is configured to drive the second splitter plate to rotate.

13. The dividing wall column according to claim 11, wherein the second splitter plate is configured to rotate between a third position and a fourth position, wherein at the third position the second splitter plate impedes the stream from above the second splitter plate from entering the first space, and at the fourth position the second splitter plate impedes the stream from above the second splitter plate from entering the second space.

14. The dividing wall column according to claim 11, wherein the partition plate and the second shaft are located in a same axial plane of the dividing wall column.

15. The dividing wall column according to claim 14, wherein the second splitter plate is in a shape of a circular segment.

16. The dividing wall column according to claim 15,
wherein the circular segment of the second splitter plate has a chord having a length equaling the inner diameter of the dividing wall column; and
wherein a vertical distance from a top of the circular segment of the second splitter plate to the chord of the circular segment of the second splitter plate is shorter than the distance from the center of the dividing wall column to the inner wall of the dividing wall column.

17. The dividing wall column according to claim 14,
wherein the second shaft has one end supported on an inner wall of the column, and another end connected to a rotation controller disposed outside the dividing wall column.

* * * * *